United States Patent
Long et al.

(10) Patent No.: US 10,433,156 B1
(45) Date of Patent: Oct. 1, 2019

(54) ADAPTING SUBSCRIBER IDENTITY MODULE (SIM) CARD

(71) Applicant: Sprint Communications Company L.P., Overland Park, KS (US)

(72) Inventors: Susan Long, Kansas City, KS (US); Adrian M. Milner, Gardner, KS (US); Maksym Siryy, Louisburg, KS (US); Bret D. Sumner, Lawrence, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/961,797

(22) Filed: Apr. 24, 2018

(51) Int. Cl.
| | |
|---|---|
| *H04M 3/00* | (2006.01) |
| *H04W 8/22* | (2009.01) |
| *H04W 8/18* | (2009.01) |
| *H04W 8/02* | (2009.01) |
| *H04W 8/20* | (2009.01) |
| *H04L 29/12* | (2006.01) |

(52) U.S. Cl.
CPC .............. *H04W 8/22* (2013.01); *H04W 8/02* (2013.01); *H04W 8/183* (2013.01); *H04W 8/205* (2013.01); *H04L 61/1588* (2013.01); *H04L 61/6054* (2013.01)

(58) Field of Classification Search
CPC ......... H04W 8/22; H04W 8/02; H04W 8/183; H04W 8/205; H04W 4/60; H04L 61/1588; H04L 61/6054; H04L 63/0853
See application file for complete search history.

(56) References Cited

U.S. PATENT DOCUMENTS

| | | | | |
|---|---|---|---|---|
| 2013/0072257 A1* | 3/2013 | Evans | .................... | H04W 12/04 455/558 |
| 2016/0173156 A1* | 6/2016 | Wane | ...................... | H04W 4/50 455/558 |
| 2017/0026827 A1* | 1/2017 | Yonekura | ................ | H04W 8/22 |

OTHER PUBLICATIONS

Milner, Adrian M., et al., "Univeral Integrated Circuit Card (UICC) Toolkit," filed Oct. 25, 2017, U.S. Appl. No. 15/793,971.

\* cited by examiner

*Primary Examiner* — Barry W Taylor (57) ABSTRACT

A subscriber identity module (SIM) card. The SIM card comprises a processor and a non-transitory memory that stores an initiation application and a plurality of profile components, where the plurality of components comprise the components of a USIM, the components of a CSIM, and the components of an ISIM. When executed by the processor, the initiation application looks up a profile identity in a table of profile identities stored in the non-transitory memory based on an identity of a brand and model of a mobile communication device with which the SIM card is associated, builds a SIM profile associated with the looked-up profile identity from the plurality of profile components, where the SIM profile comprises an international mobile subscriber identity (IMSI), a file that defines roaming behavior, and mobile network authentication keys, and sends at least some of the contents of the SIM profile to the radio transceiver.

15 Claims, 8 Drawing Sheets

ADAPTING SUBSCRIBER IDENTITY MODULE (SIM) CARD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A subscriber identity module (SIM) card may be inserted into a mobile communication device to differentiate one wireless communication service subscriber from a different subscriber and to differentiate one mobile network operator from another. The SIM card may store data for establishing and maintaining wireless communication links between a mobile communication device and cell sites or cell towers. For example, the SIM card may store authentication keys for granting wireless service to the mobile communication device. The SIM card may store roaming rules and data. A SIM card may be a removable card with processing and memory capability but without its own power source.

SUMMARY

In an embodiment, a method of initiating a mobile communication device is disclosed. The method comprises, in response to a power-on event of the mobile communication device, reading an identity of a brand and model of the mobile communication device from a non-transitory memory of the mobile communication device by an initiation application executing on a subscriber identity module (SIM) card connected to the mobile communication device and looking up a profile identity by the initiation application in a table of profile identities stored in the SIM card based on the identity of the brand and model of the mobile communication device. The method further comprises, based on the looked-up profile identity, building a SIM profile associated with the looked-up profile identity by the initiation application from a plurality of profile components stored in the SIM card, where the SIM profile comprises an international mobile subscriber identity (IMSI), a public land mobile network (PLMN) file that defines roaming behavior, and mobile network authentication keys, sending a refresh proactive command by the initiation application to a radio transceiver of the mobile communication device, and sending at least some of the contents of the SIM profile to the radio transceiver by the initiation application.

In another embodiment, a method of initiating a mobile communication device is disclosed. The method comprises, in response to a power-on event of the mobile communication device, presenting a dialer keypad interface on a display screen of the mobile communication device, transmitting dialed digits from a dialer application executing on the mobile communication device to a subscriber identity module (SIM) card connected to the mobile communication device, based on the dialed digits, building a SIM profile by an initiation application executing on the SIM card from a plurality of profile components stored in the SIM card, where the SIM profile comprises an international mobile subscriber identity (IMSI), a public land mobile network (PLMN) file that defines roaming behavior, and mobile network authentication keys, sending a refresh proactive command by the initiation application to a radio transceiver of the mobile communication device, and sending at least some of the contents of the SIM profile to the radio transceiver by the initiation application.

In yet another embodiment, a subscriber identity module (SIM) card is disclosed. The SIM card comprises a processor and a non-transitory memory storing an initiation application and a plurality of profile components, where the plurality of components comprise the components of a USIM, the components of a CSIM, and the components of an ISIM. When executed by the processor, the initiation application, in response to a power-on event of a mobile communication device into which the SIM card is installed, looks up a profile identity in a table of profile identities stored in the non-transitory memory based on an identity of the brand and model of the mobile communication device, based on the looked-up profile identity, builds a SIM profile associated with the looked-up profile identity from the plurality of profile components stored in the SIM, where the SIM profile comprises an international mobile subscriber identity (IMSI), a public land mobile network (PLMN) file that defines roaming behavior, and mobile network authentication keys, sends a refresh proactive command by the initiation application to a radio transceiver of the mobile communication device, and sends at least some of the contents of the SIM profile to the radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Subscriber identity module (SIM) cards can be used to configure a mobile communication device for subscription services in a wireless communication network. For example, by inserting a SIM card associated with a first wireless communication network into a mobile device, a user may obtain wireless communication service from the first wireless network; by inserting a different SIM card associated with a second wireless network into the device, the user may obtain wireless communication service from a second wireless network. As US wireless communication service providers transition from the subsidized mobile communication device business model to an open mobile device (OMD) business model (also referred to as "bring your own device"), it may be desirable to initiate a subscription account for an OMD by selling a SIM card kit. A user who owns his or her phone and wants to initiate wireless communication services from a carrier buys the SIM card kit for that carrier, plugs that SIM card into his or her phone, powers on the phone, and the phone is activated. A challenge can arise, however, in that different phones may use different wireless protocols that have traditionally been supported by different SIM cards. Said in other words, traditionally SIM cards have been capable of supporting only one wireless protocol. Additionally, it has also historically been the case that SIM cards were engineered for a specific brand and model of device as well as for a specific wireless protocol. Producing and distributing SIM kits to retail outlets that support every combination of wireless protocol, device brand, and device model poses logistics and efficiency problems.

The present disclosure teaches an adapting SIM card—a morphing SIM card—that stores the components that make up a plurality of different SIM profiles; determines the specific wireless protocol, device brand, and device model that apply to the mobile communication device into which the SIM card is installed; builds a specific profile having only those components selected from the stored profile components that are suitable for the device; and initiates the device accordingly. This solution avoids the problem of making, distributing, and selling a different SIM kit for each different combination of protocol, device brand, and device model supported by a wireless communication service provider.

A SIM card comprises a physical layer, an operating system, and a SIM profile. The SIM card receives power and ground from the mobile communication device into which it is connected and/or inserted. The SIM profile can contain different components for different wireless protocols, different device brands, and different device models. The SIM profile may comprise identifying information, for example an international mobile subscriber identity (IMSI), a mobile subscription identity number (MSIN), and/or other identifying information. The SIM profile may comprise one or more public land mobile network (PLMN) files that define roaming behavior for a mobile communication device, such as one or more preferred roaming lists. The SIM profile may comprise subscriber credentials and authentication keys for accessing communication services via the wireless communication network. The SIM profile may also comprise one or more applications such as a network authentication application (NAA) suited to the specific wireless protocol associated with the mobile communication device and/or the subscription service plan. It will be appreciated that for different combinations of protocol, device brand, and device model the SIM profile may be different in various ways.

The present disclosure teaches storing profile components associated with a plurality of different SIM configurations and building the SIM profile from a sub-set of the profile components to adopt the SIM card for use in a mobile communication device associated with a specific combination of protocol, brand, and model. For example, a SIM card may store profile components A, B, C, D, E, F, and G. A first SIM profile may be composed of profile components A, C, and F; a second SIM profile may be composed of profile components B, C, and D; and a third SIM profile may be composed of profile components C, D, E, and F. When the SIM card powers on (e.g., when the mobile communication device to which the SIM card is connected powers on), the SIM card requests the international mobile equipment identity (IMEI) from the device and compares that IMEI to a stored value of IMEI. If the values match, the SIM card has already adapted and built its SIM profile and stored it in non-transitory memory in the SIM card. If the IMEI values do not match, the SIM card may infer that it has been inserted for the first time into the mobile communication device and desirably adapts its SIM profile accordingly.

The SIM card may use the IMEI to find a corresponding type allocation card (TAC) value in a file stored in the SIM card and uses the TAC value to find a corresponding profile identity in another file stored in the SIM card. The SIM card uses the profile identity to determine what stored profile components to build into the SIM profile. This may be viewed as a kind of SIM recipe or SIM specification. Using the example from above, a first profile identity may have a recipe of component A, component C, and component F; a second profile identity may have a recipe of component B, component C, and component D; a third profile identity may have a recipe of component C, component D, component E, and component F. When a profile recipe has been determined, the SIM card builds the SIM profile from stored profile components according to the subject profile recipe. After building the SIM profile, the SIM card sends a proactive command to the mobile communication device to refresh the SIM profile, and the mobile communication device reads at least some of the information stored in the SIM card.

In an embodiment, if the IMEI returned by the mobile communication device fails one or more validity checks or the IMEI does not map to a defined TAC value, the SIM card may configure itself with a default profile recipe which enables the mobile communication device to reach out to a server in the wireless communication service provider's network to continue the SIM card adaptation. For example, the server in the network may send an over-the-air update with a revised file with TAC value entries not in the original file. The mobile communication device may then be rebooted (and hence the SIM card experience a power on) and the processing described above may recur and succeed this iteration. In an embodiment, if the SIM card fails to determine a profile identity to use to build the SIM profile, the SIM card may cause the mobile communication device to present a user interface and prompt a user to manually select a profile identity. The SIM card may cause the mobile communication device to present a list of profile identities for the user to select from. This profile identity may then be provided to the SIM card, and the SIM profile may be built based on the profile recipe associated with the manually input profile identity.

Figure 1:
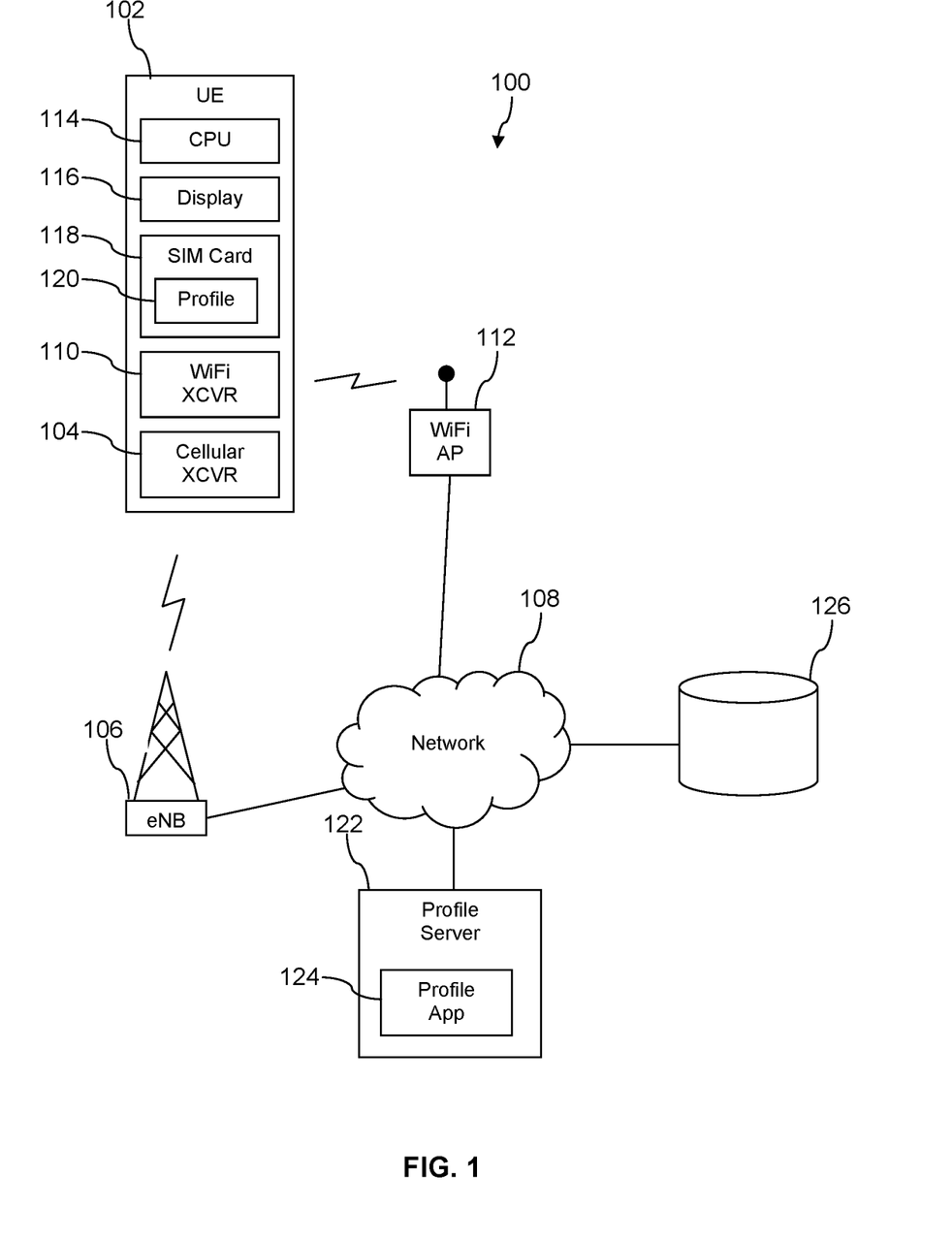
FIG. 1 is an illustration of communication system according to an embodiment of the disclosure.

Turning now to FIG. 1, a system 100 is described. In an embodiment, the system 100 comprises a mobile communication device (user equipment—UE) 102 having a cellular radio transceiver 104 that can establish a wireless communication link with a cell site (eNB) 106 according to one of a long term evolution (LTE), a code division multiple access (CDMA), a global system for mobile communication (GSM), or a worldwide interoperability for microwave access (WiMAX) wireless communication protocol. The mobile communication device 102 is one of a mobile phone, a smart phone, a personal digital assistant (PDA), a wearable computer, a headset computer, a media player, a laptop computer, a notebook computer, or a tablet computer. When the cellular radio transceiver 104 is wirelessly coupled to the cell site 106, the cell site 106 may communicatively couple the cellular radio transceiver 104 and/or the mobile communication device 102 to a network 108. The network 108 may comprise one or more private networks, one or more public networks, or a combination thereof. The mobile communication device 102 may perform voice calls and/or data sessions via the network 108. While FIG. 1 illustrates a single mobile communication device 102 and a single cell site 106, the system 100 may comprise any number of devices 102 and cell sites 106. In an embodiment, the mobile communication device 102 further comprises a WiFi radio transceiver 110 that is able to establish a wireless link with a WiFi access point (AP) 112. The WiFi AP 112 may communicatively couple the device 102 to the network 108.

The mobile communication device 102 comprises a processor 114, a display 116, and a subscriber identity module (SIM) card 118. When the SIM card 118 and the mobile communication device 102 are fully configured and activated, the SIM card 118 stores a SIM profile 120 that provides data and functionality to promote the device 102 authenticating itself with the cell site 106 to obtain a wireless communication link. The SIM card 118 may provide other functions, for example storing information such as a contacts list. The SIM card 118 is capable of building the SIM profile 120 during initiation of the mobile communication device 102, for example when the SIM card 118 is first installed into and connected to the device 102 and the device 102 is turned on (i.e., powered on). In an embodiment, in some cases the SIM card 118 may cause the device 102 to communicate with a profile server 122 and a profile application 124 that executes on the profile server 122 to determine a profile identity on behalf of the SIM card 118, for example by using a type allocation code (TAC) provided by the device 102 to the profile application 124 to search in a profile data store 126. If a profile identity that associates to the TAC is found, the profile identity is returned to the device 102 by the profile application 124, the profile identity is provided by the device 102 to the SIM card 118, and the SIM card 118 builds the profile 120 based on the profile identity. The profile application 124 may also send a profile recipe or a profile specification about how to build the profile from profile components with the profile identity to the device 102.

Figure 2:
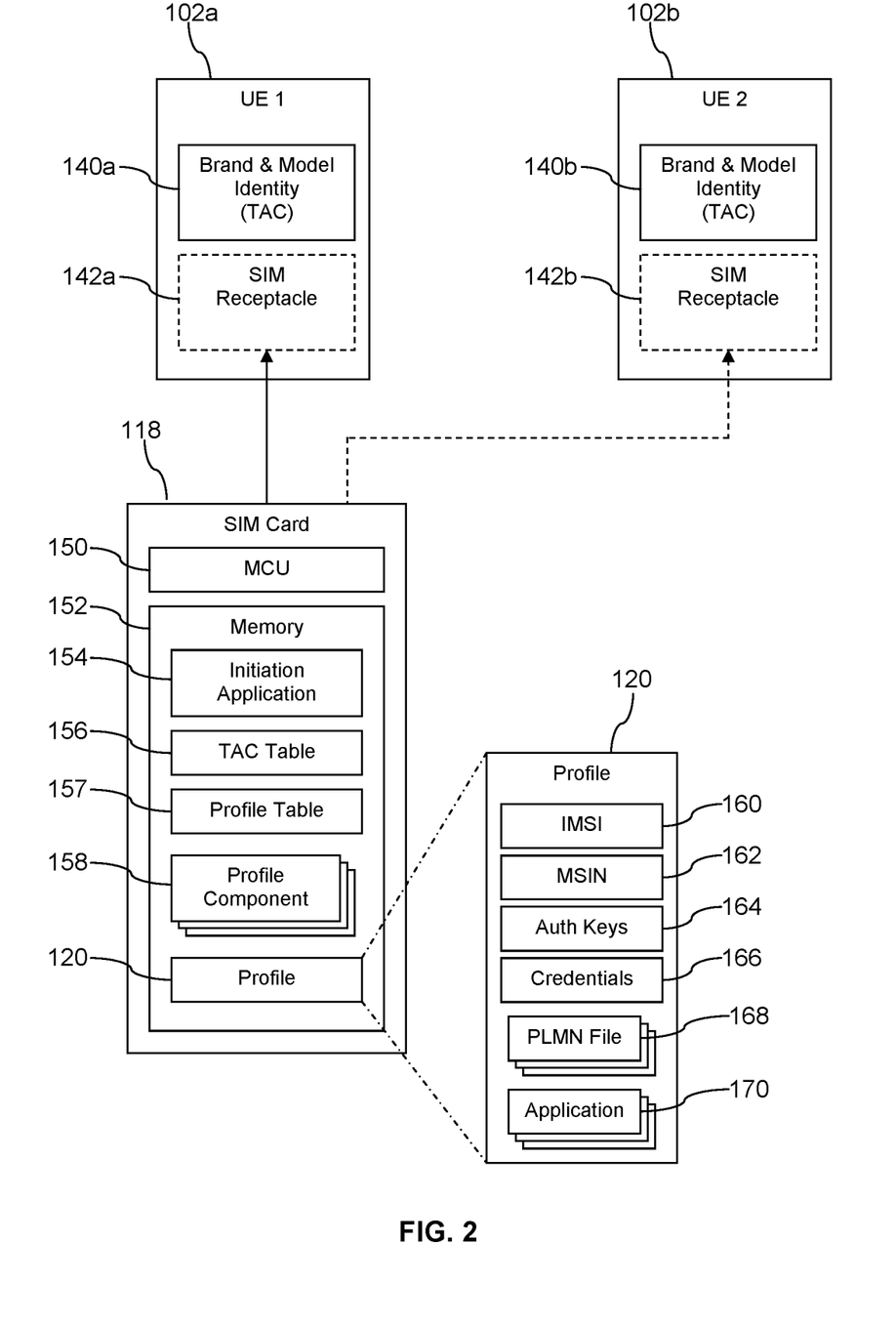
FIG. 2 is an illustration of a subscriber identity module (SIM) card according to an embodiment of the disclosure.

Turning now to FIG. 2, further details of the SIM card 118 and the mobile communication device 102 are described. In an embodiment, the SIM card 118 comprises a SIM processor 150 (e.g., a microcontroller unit or other processor) and a SIM non-transitory memory 152. The SIM card 118 is configured for physically connecting to the mobile communication device 102, for example by being inserted into a SIM receptacle 142 and having electrical contacts of the SIM card 118 mate with corresponding electrical contacts of the SIM receptacle 142 (electrical contacts not shown). In an embodiment, the electrical interface between the SIM card 118 and the SIM receptacle 142 (and thus the mobile communication device 102) comprises an electrical power input to the SIM card 118, an electrical ground input to the SIM card 118, a signal input to the SIM card 118, and a signal output from the SIM card 118. In another embodiment, a different interface may be provided between the SIM card 118 and the SIM receptacle 142. The mobile communication device 102 may be provided with a brand and model identity 140 such as a TAC. Alternatively, the mobile communication device 102 may be provided with an international mobile equipment identity (IMEI) that is stored in non-transitory memory of the device 102, and the IMEI is translated by the SIM card 118 to a brand and model identity or to a type allocation code (TAC).

The SIM card 118 may be connected to a first mobile communication device 102a at a first time and removed from the first mobile communication device 102a at a second time and connected to a second mobile communication device 102b. The SIM card 118 is able to detect the change between installation into the first device 102a and installation into the second device 102b and build the profile 120 accordingly. Alternatively, the same SIM card 118 is capable of being used with the first mobile communication device 102a or the second mobile communication device 102b, whichever device 102 a user may possess, and adapt and build the SIM profile 120 appropriately for the device 102 that it is connected to.

In an embodiment, the SIM memory 152 comprises the SIM profile 120, a SIM initiation application 154, a TAC table 156, a profile table 157, and a plurality of profile components 158. In an embodiment, the TAC table 156 and the profile table 157 may be combined in a single table or data base. It is understood that the SIM profile 120 may not be present in the SIM memory 152 in an initial condition of the SIM card 118, for example before the SIM card 118 has been connected into a mobile communication device 102 and gone through an initial power-on cycle. The profile components 158 may comprise one or more international mobile subscriber identities (IMSI), one or more mobile subscriber identity numbers (MSIN), one or more sets of authentication keys, one or more sets of credentials, and one or more SIM applications. By selecting appropriate profile components 158, the SIM initiation application 154 may be able to build a plurality of different SIM profiles 120, for example different SIM profiles 120 for different devices 102 having different brand and model identities 140.

When the SIM card 118 experiences a power-on event, the SIM initiation application 154 is executed by the SIM processor 150. The SIM initiation application 154 requests the international mobile equipment identity (IMEI) from the mobile communication device 102. If the IMEI is valid, the SIM initiation application 154 compares the IMEI to a stored IMEI value stored in the SIM card 118. If the IMEI received from the device 102 matches the stored IMEI, the SIM card 118 is assumed to be already initiated, and the SIM initiation application 154 ends. If the IMEI is valid but not the same as the stored IMEI, the SIM initiation application 154 uses the IMEI to search in the TAC table 156 for a TAC that associates to the IMEI. If the IMEI is invalid or if the IMEI is not associated to a TAC in the TAC table 156, the SIM initiation application 154 may select and use a default profile identity. On the other hand, if the IMEI does associate to a TAC in the TAC table 156, the SIM initiation application 154 then uses the TAC to search in the profile table 157 for a profile identity associated with the wireless protocol, device brand, and device model of the subject mobile communication device 102. In an alternative embodiment, the contents of the TAC table 156 and the profile table 157 may be combined as a single table or data store, for example, the combined structure may use the IMEI to associate directly to a profile identity. If the IMEI is found to be invalid or if the search in the profile table 157 using the TAC does not find a profile identity, the SIM initiation application 154 goes forwards with its processing with a default profile identity.

With the profile identity determined, the SIM initiation application 154 locates a profile recipe or profile composition specification and uses it to build the SIM profile 120 from the profile components 158. It will be appreciated that the SIM profile 120 built in this way is particular to the subject mobile communication device 102 (e.g., to the combination of wireless protocol, device brand, and device model). The SIM profile 120 may comprise an IMSI 160, a MSIN 162, authentication keys 164, subscriber credentials 166, one or more PLMN files 168 that describe roaming behavior of the device 102 that the SIM card 118 is used in, and one or more SIM application 170. The SIM application 170 may comprise one or more of a USIM application, a CSIM application, or a ISIM application. After the SIM initiation application 154 has built the SIM profile 120, it sends a proactive command to the device 102 so the device 102 reads the contents of the SIM profile 120. The SIM initiation application 154 also stores the IMEI received from the device 102 in the SIM memory 152 for use on future power-up cycles.

If the SIM initiation application 154 experiences a problem determining a SIM profile identity, it may command the device 102 to present a user interface on the display 116 in which to prompt the user to manually select a SIM profile identity. The user may enter a short code such as ##x, where 'x' is an integer or other character identifying a SIM profile identity. The user interface may be a dialer application, and the dialed digits may be forwarded by the dialer application to the SIM card 118 and thence to the SIM initiation application 154.

Figure 3:
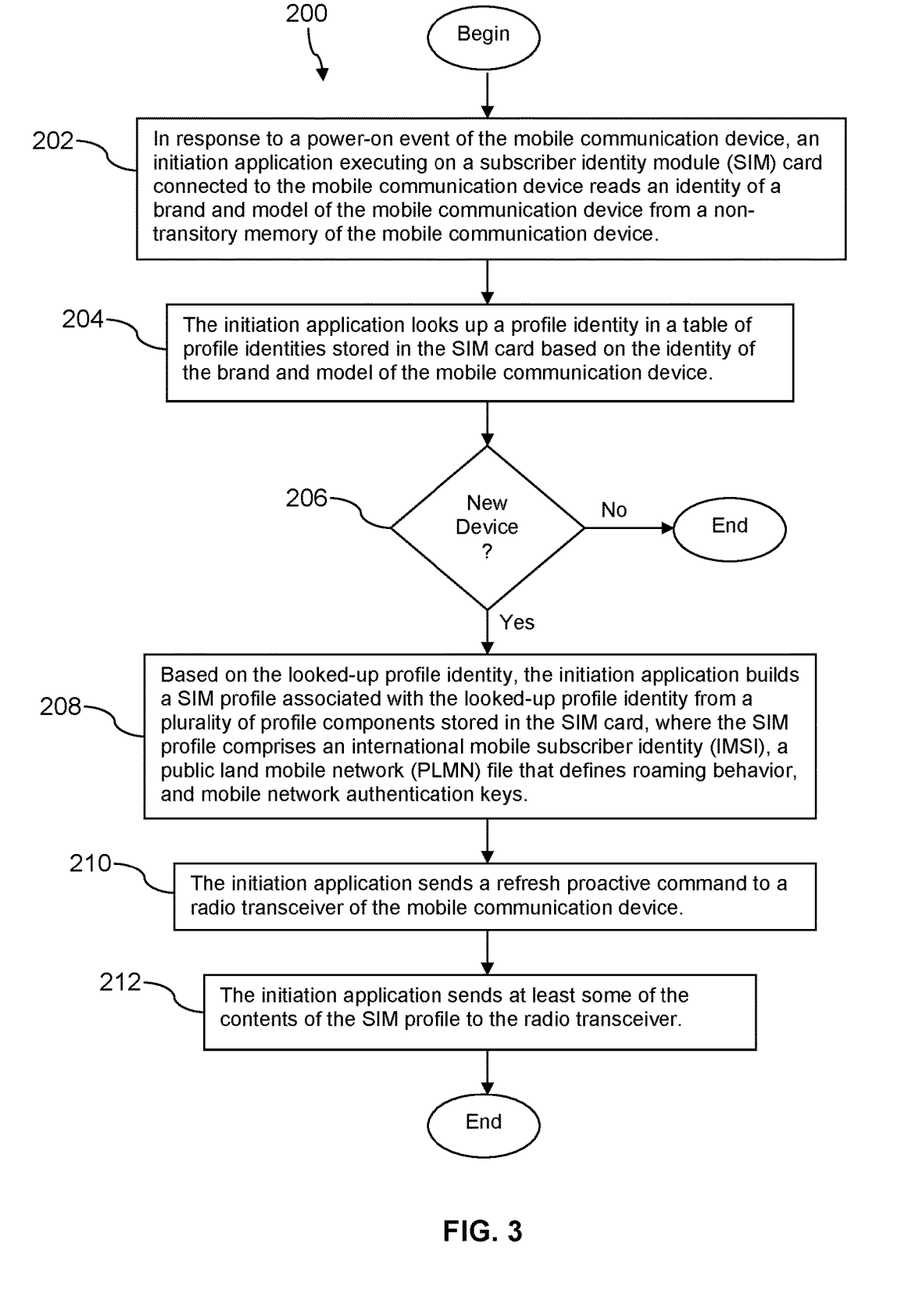
FIG. 3 is a flow chart of a method according to an embodiment of the disclosure.

Turning now to FIG. 3, a method 200 is described. At block 202, in response to a power-on event of the mobile communication device, an initiation application executing on a subscriber identity module (SIM) card connected to the mobile communication device reads an identity of a brand and model of the mobile communication device from a non-transitory memory of the mobile communication device. For example, the SIM initiation application 154 requests and receives the IMEI of the device from the mobile communication device 102 and uses this IMEI to look up the TAC of the device in the TAC table 156. At block 204, the initiation application looks up a profile identity in a table of profile identities stored in the SIM card based on the identity of the brand and model of the mobile communication device. For example, the SIM initiation application 154 uses the TAC looked up in block 202 to look-up a SIM profile identity in the profile table 157.

At block 206, if the initiation application determines that it is installed in a new device (e.g., if the IMEI returned to the SIM initiation application 154 from the mobile communication device 102 is not recorded in the SIM card 118), the processing proceeds to block 208 otherwise the method 200 ends.

At block 208, based on the looked-up profile identity, the initiation application builds a profile (i.e., the SIM profile 120) associated with the looked-up profile identity from a plurality of profile components stored in the SIM, where the profile comprises an international mobile subscriber identity (IMSI), a public land mobile network (PLMN) file that defines roaming behavior, and mobile network authentication keys. At block 210, the initiation application sends a refresh proactive command to a radio transceiver of the mobile communication device. At block 212, the initiation application sends at least some of the contents of the profile to the radio transceiver. In this way, the radio transceiver may be prepared for initiating network communications via a cell site whereby to complete activation and/or to conduct normal communications. It is noted that the same SIM card 118 installed and/or connected into different devices 102 associated with different TACs will build and transmit a different SIM profile to the radio transceiver.

Figure 4:
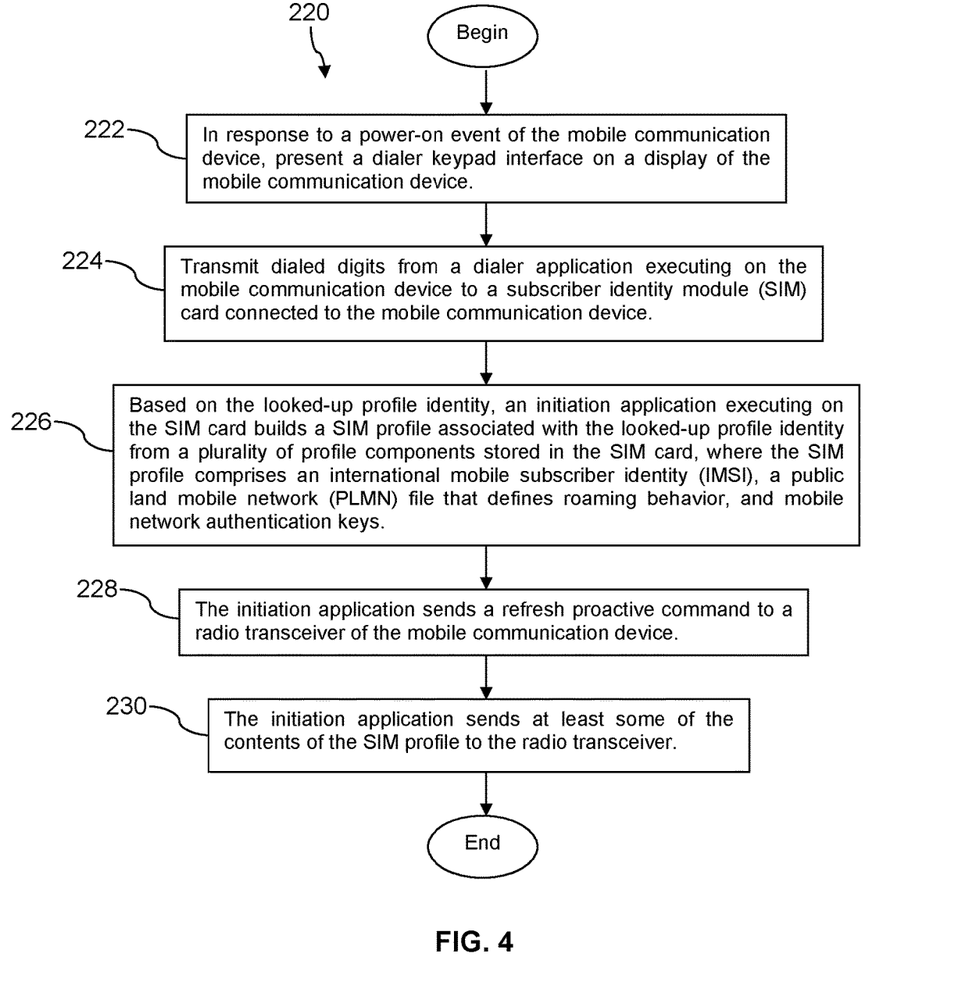
FIG. 4 is a flow chart of another method according to an embodiment of the disclosure.

Turning now to FIG. 4, a method 220 is described. At block 222, in response to a power-on event of the mobile communication device, present a dialer keypad interface on a display of the mobile communication device. The SIM initiation application 154 may send a manual SIM profile collection command to the mobile communication device 102 if the autonomous determination of the appropriate SIM profile (i.e., the process of blocks 202 and 204 described above with reference to FIG. 3) fails. The processing of block 222 may further involve presenting a message prompting the user to enter a manual SIM profile short code and may indicate a web address for looking-up the appropriate SIM profile short code from a web browser. Alternatively, the SIM card 118 may be sold with written instructions that provide guidance on selecting a SIM profile short code.

At block 224, a dialer application executing on the mobile communication device transmits dialed digits to a subscriber identity module (SIM) card connected to the mobile communication device. At block 226, based on the looked-up profile identity, an initiation application executing on the SIM card builds a profile associated with the looked-up profile identity from a plurality of profile components stored in the SIM card, where the profile comprises an international mobile subscriber identity (IMSI), a public land mobile network (PLMN) file that defines roaming behavior, and mobile network authentication keys. At block 228, the initiation application sends a refresh proactive command to a radio transceiver of the mobile communication device. At block 230, the initiation application sends at least some of the contents of the profile to the radio transceiver. In this way, the radio transceiver may be prepared for initiating network communications via a cell site whereby to complete activation and/or to conduct normal communications. It is noted that the same SIM card 118 installed and/or connected into different devices 102 associated with different TACs may build and transmit a different SIM profile to the radio transceiver, based on a user inputting different SIM short codes when prompted.

Figure 5:
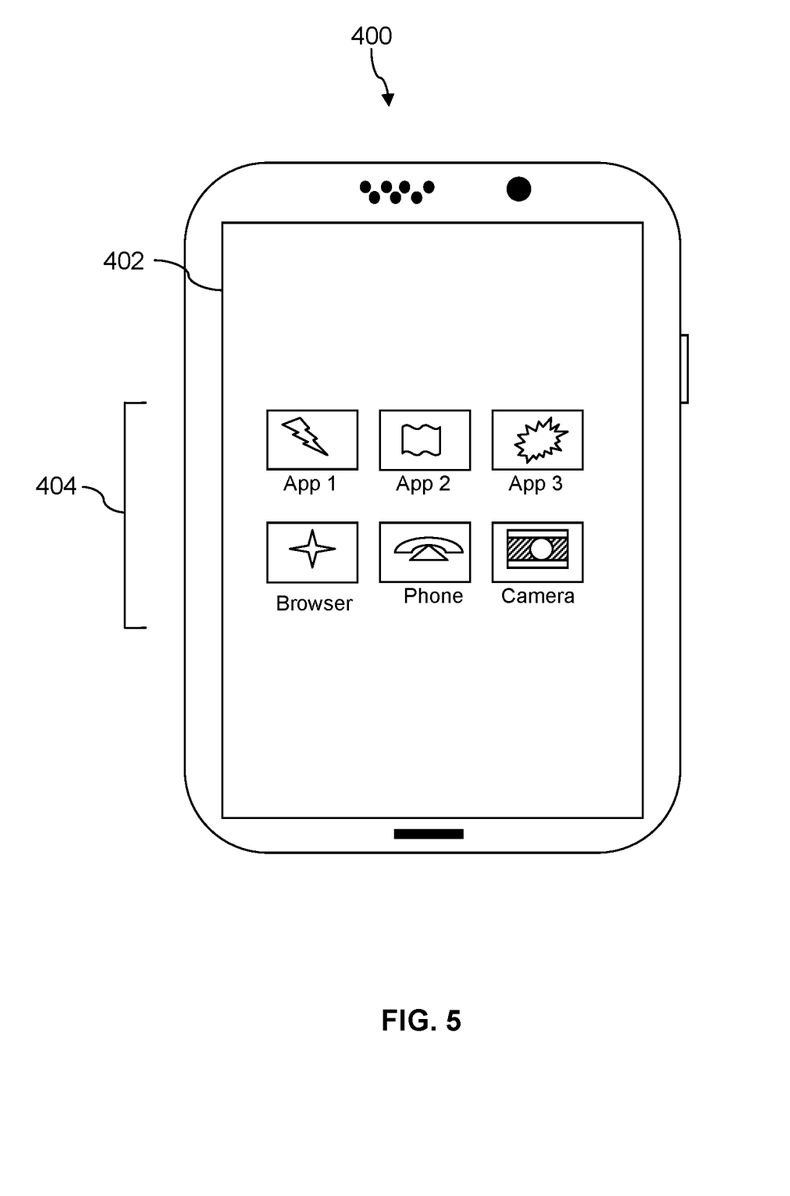
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
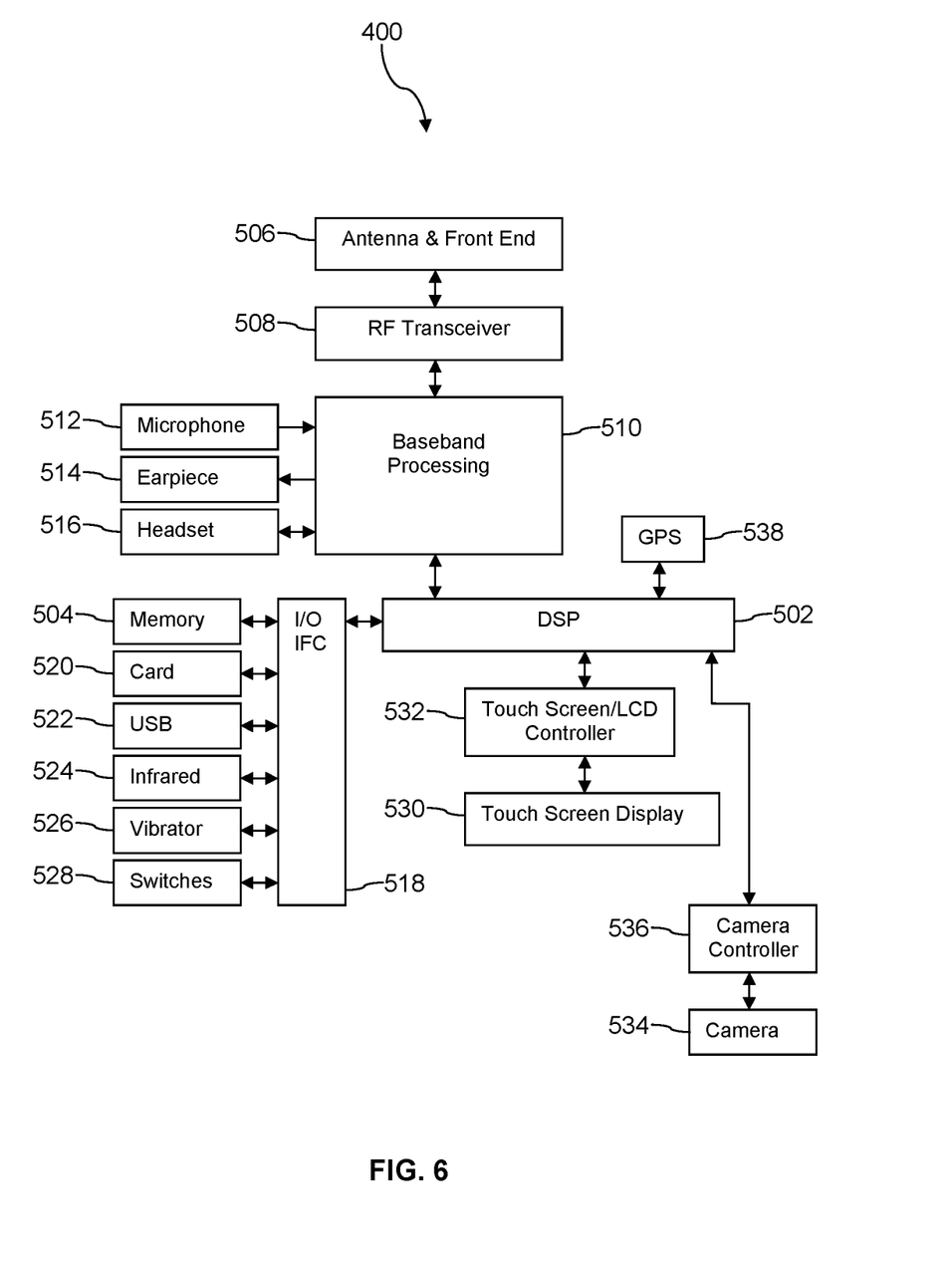
FIG. 6 is a block diagram of a hardware architecture according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
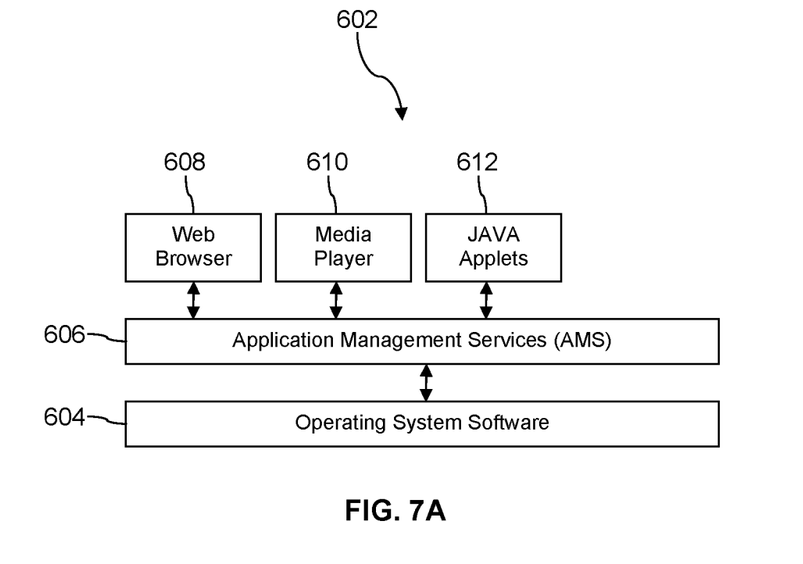
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
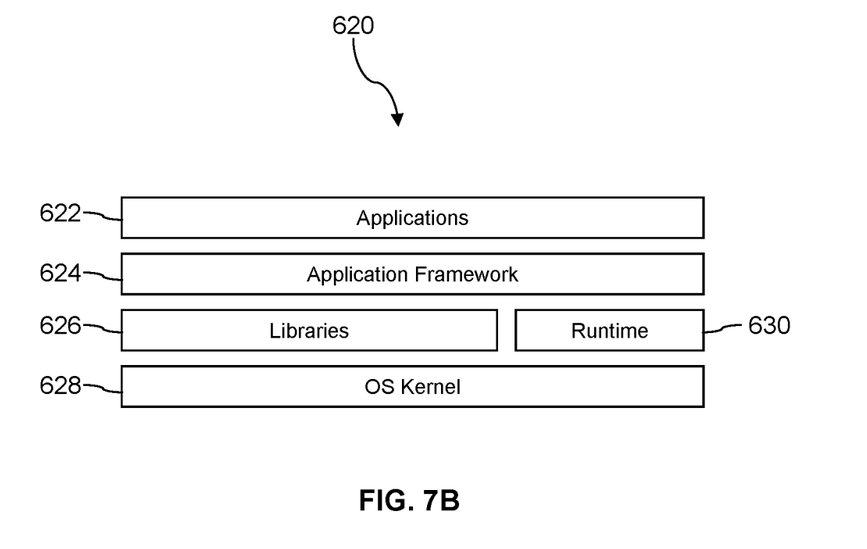
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
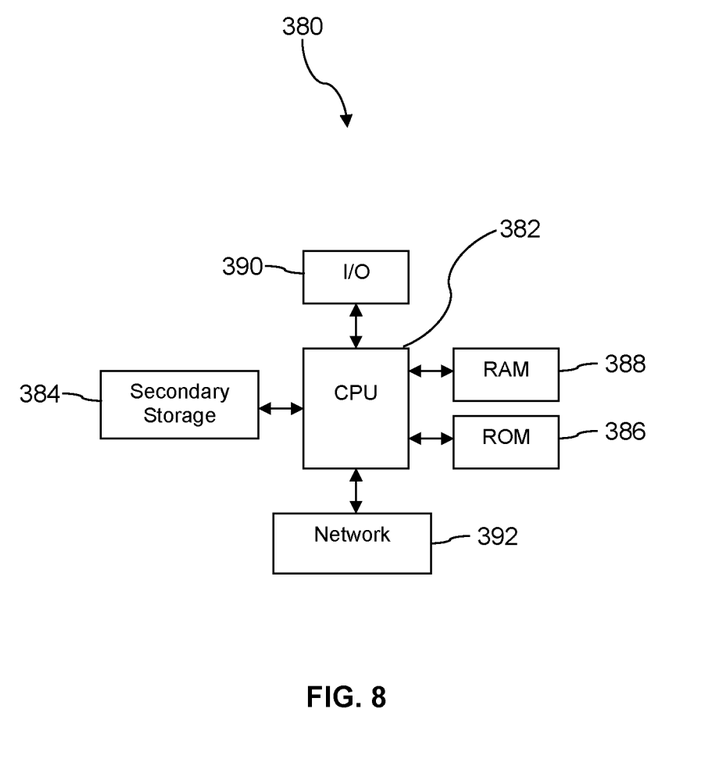
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of initiating a mobile communication device, each step of the method performed by an initiation application executing on a subscriber identity module (SIM) card connected to the mobile communication device, the method comprising:

in response to a power-on event of the mobile communication device, requesting and receiving an international mobile equipment identity (IMEI) from the mobile communication device;

reading an identity of a brand and model of the mobile communication device from a non-transitory memory of the mobile communication device by looking up a type allocation code (TAC) in a table of the SIM card based on the IMEI, wherein the SIM card stores a plurality of profile components for different wireless protocols, different device brands, and different device models;

looking up a profile identity in a table of profile identities stored in the SIM card based on the looked-up TAC;

based on the looked-up profile identity, building a SIM profile having a subset of profile components selected from the plurality of profile components stored in the SIM card, where the SIM profile is associated with the looked-up profile identity and comprises an international mobile subscriber identity (IMSI), a public land mobile network (PLMN) file that defines roaming behavior, and mobile network authentication keys;

sending a refresh proactive command to a radio transceiver of the mobile communication device; and sending at least some of the contents of the SIM profile to the radio transceiver.

2. The method of claim 1, wherein the table in which the TAC is looked up is the table of profile identities.

3. The method of claim 1, wherein the mobile communication device is one of a mobile phone, a smart phone, a personal digital assistant (PDA), a wearable computer, a headset computer, a media player, a laptop computer, a notebook computer, or a tablet computer.

4. The method of claim 1, wherein the mobile communication device is capable of establishing a wireless communication link according to at least one of a long term evolution (LTE), a code division multiple access (CDMA), a global system for mobile communication (GSM), or a worldwide interoperability for microwave access (WiMAX) wireless communication protocol.

5. A method of initiating a mobile communication device, comprising:

requesting, by an initiation application executing on a subscriber identity module (SIM) card, an international mobile equipment identity (IMEI) from the mobile communication device, wherein the SIM card stores a plurality of profile components for different wireless protocols, different device brands, and different device models;

attempting to look up a type allocation code (TAC) of the mobile communication device based on the IMEI in a TAC table of the SIM card;

in response to finding a TAC associated with the IMEI in the TAC table, attempting to look up a profile identity based on the TAC in a profile table of the SIM card;

in response to a power-on event of the mobile communication device and in response to failing to find the TAC associated with the IMEI in the TAC table or failing to find a profile identity associated with the TAC in the profile table, presenting a dialer keypad interface on a display screen of the mobile communication device;

transmitting dialed digits from a dialer application executing on the mobile communication device to the SIM card connected to the mobile communication device;

based on the dialed digits, building, by the initiation application, a SIM profile having a subset of profile components selected from the plurality of profile components stored in the SIM card, where the SIM profile comprises an international mobile subscriber identity (IMSI), a public land mobile network (PLMN) file that defines roaming behavior, and mobile network authentication keys;

sending a refresh proactive command by the initiation application to a radio transceiver of the mobile communication device; and sending at least some of the contents of the SIM profile to the radio transceiver by the initiation application.

6. The method of claim 5, further comprising converting the dialed digits to a profile identity, wherein building the SIM profile based on the dialed digits comprises building the SIM profile according to a profile specification associated with the profile identity.

7. The method of claim 5, wherein the SIM profile further comprises subscriber keys.

8. The method of claim 5, wherein the SIM profile further comprises at least one SIM application.

9. The method of claim 8, wherein the SIM application is one of a USIM application, a CSIM application, or an ISIM application.

10. A subscriber identity module (SIM) card, comprising:
a processor;
a non-transitory memory;
a plurality of profile components for different wireless protocols, different device brands, and different device models, where the plurality of components comprise the components of a USIM, the components of a CSIM, and the components of an ISIM;
an initiation application stored in the non-transitory memory that, when executed by the processor;
in response to a power-on event of a mobile communication device into which the SIM card is installed, requests and receives an international mobile equipment identity (IMEI) from the mobile communication device;
looks up a type allocation code (TAC) in a table stored in the non-transitory memory based on the IMEI to determine an identity of a brand and model of the mobile communication device;
looks up a profile identity in a table of profile identities stored in the non-transitory memory based on the looked-up TAC;
based on the looked-up profile identity, builds a SIM profile having a subset of profile components selected from the plurality of profile components stored in the SIM, where the SIM profile is associated with the looked-up profile identity and comprises an international mobile subscriber identity (IMSI), a public land mobile network (PLMN) file that defines roaming behavior, and mobile network authentication keys;
sends a refresh proactive command by the initiation application to a radio transceiver of the mobile communication device; and
sends at least some of the contents of the SIM profile to the radio transceiver.

11. The SIM card of claim 10, wherein the SIM profile further comprises subscriber keys.

12. The SIM card of claim 10, wherein the SIM profile further comprises at least one SIM application.

13. The SIM card of claim 12, wherein the SIM application is one of a USIM application, a CSIM application, or an ISIM application.

14. The SIM card of claim 10, wherein the mobile communication device is one of a mobile phone, a smart phone, a personal digital assistant (PDA), a wearable computer, a headset computer, a media player, a laptop computer, a notebook computer, or a tablet computer.

15. The SIM card of claim 14, wherein the mobile communication device is capable of establishing a wireless communication link according to at least one of a long term evolution (LTE), a code division multiple access (CDMA), a global system for mobile communication (GSM), or a worldwide interoperability for microwave access (WiMAX) wireless communication protocol.

* * * * *